US006859875B1

(12) United States Patent
Moyer et al.

(10) Patent No.: US 6,859,875 B1
(45) Date of Patent: Feb. 22, 2005

(54) PROCESSOR HAVING SELECTIVE BRANCH PREDICTION

(75) Inventors: William C. Moyer, Dripping Springs, TX (US); Jeffrey W. Scott, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 605 days.

(21) Appl. No.: 09/592,449

(22) Filed: Jun. 12, 2000

(51) Int. Cl.$^7$ .............................. G06F 9/32; G06F 9/38
(52) U.S. Cl. ...................................... 712/239; 712/233
(58) Field of Search ................................ 712/233–240, 712/207, 220, 23; 711/213, 214, 219

(56) References Cited

U.S. PATENT DOCUMENTS

| 5,553,255 A | | 9/1996 | Jain et al. ..................... 395/375 |
| 5,701,448 A | * | 12/1997 | White ......................... 712/233 |
| 5,732,253 A | * | 3/1998 | McMahan ..................... 712/239 |
| 5,809,294 A | * | 9/1998 | Ando .......................... 712/233 |
| 5,835,967 A | * | 11/1998 | McMahan ..................... 711/213 |
| 5,901,307 A | * | 5/1999 | Potter et al. ................. 712/240 |
| 5,949,995 A | * | 9/1999 | Freeman ...................... 712/239 |
| 5,996,071 A | * | 11/1999 | White et al. ................. 712/238 |
| 6,088,793 A | * | 7/2000 | Liu et al. ..................... 712/239 |
| 6,446,197 B1 | * | 9/2002 | Krishnan et al. ............ 712/237 |

FOREIGN PATENT DOCUMENTS

| EP | 893 756 A2 | 1/1999 |
| EP | 938 044 A2 | 8/1999 |
| GB | 2 283 595 A | 10/1994 |

OTHER PUBLICATIONS

IBM Technical Disclosure Bulletin, vol. 32, No. 4B, Sep., 1989, Branch Prediction Assist, p. 225.
International Search Report (4 pgs.).

* cited by examiner

*Primary Examiner*—Henry W. H. Tsai
(74) *Attorney, Agent, or Firm*—Joanna G. Chiu (57) ABSTRACT

A data system capable of selecting whether to utilize address prediction based on the state of an address prediction enable signal. When employing address prediction, the outcome of branch instructions are presumed prior to the resolution of the instruction. When not using address prediction, the system waits until a branch instruction is resolved before fetching the next address to be executed. At least one embodiment of a method and data system disclosed herein makes use of the different setup timing available when employing prediction and non-prediction modes of operation.

18 Claims, 4 Drawing Sheets

| | APRED* 130 | BRANCH DECODE 210 | CONDITION 218 | ADDRESS SELECT 225 | MISPREDICT 229 |
|---|---|---|---|---|---|
| 310 → | 0 | 0 | 0 | 1 | 0 |
| 320 → | 0 | 0 | 1 | 1 | 0 |
| 330 → | 0 | 1 | 0 | 0 | 1 |
| 340 → | 0 | 1 | 1 | 0 | 0 |
| 350 → | 1 | 0 | 0 | 1 | 0 |
| 360 → | 1 | 0 | 1 | 1 | 0 |
| 370 → | 1 | 1 | 0 | 1 | 0 |
| 380 → | 1 | 1 | 1 | 0 | 0 |

PROCESSOR HAVING SELECTIVE BRANCH PREDICTION

FIELD OF THE INVENTION

The present invention generally relates to data processing systems and more specifically to data processors using selective branch prediction.

Related Art

Branch prediction is one technique used to improve data processor performance. Data processors that use branch prediction techniques make a "guess" each time they receive a branch instruction whose outcome has not been resolved, act on the guess (or predicted outcome of an "unresolved branch instruction"), and then determine if the guess was correct following a "resolved branch instruction". Such a data processor predicts whether a branch ultimately will be taken and jump to a non-sequential target instruction address or whether a branch will "fall through" to the next sequential instruction. In most instances data processors that predict conditional branch instructions gain performance because they can make accurate guesses and fetch from the branch target instruction address before resolving the outcome of a conditional branch instruction. However, there is usually a performance penalty associated with wrong guesses. Since branch instructions cause a change in the sequential instruction stream fetch pattern, an incorrect address speculation can result in lost processor cycles. These processor cycles are lost because in a case of a wrong guess, the incorrectly fetched instruction stream is discarded, and the correct instruction stream must be reloaded into the processor pipeline. This form of branch prediction performance acceleration (the capability of predicting the outcome of a conditional branch instruction, and performing instruction prefetching from the resultant predicted instruction stream) is known as "branch address prediction."

Other processors do not employ branch prediction techniques. In these processors, branch instructions are resolved before a branch target instruction is fetched. The decision to design a processor employing branch prediction, versus a processor that does not employ branch prediction, can be based on a number of design factors but is usually based on the desire to save clock cycles. In some cases, it is more desirable to employ processors that do not use branch prediction, in order to eliminate the branch prediction penalty incurred by processors using speculative instruction fetching.

Therefore, a need exists for a single processor for use in both branch prediction systems and non-branch prediction systems which could help improve scalability of the processor for a wider range of applications, and lower design and production costs.

BRIEF DESCRIPTION OF THE DRAWINGS

Objects, advantages, features, and characteristics of the present invention as well as methods, operations and functions of related elements of structure and the combination of parts and economies of manufacture will become apparent upon consideration of the following description and claims with reference to the accompanying drawings all of which form a part of this specification. Wherein like reference numerals designate corresponding parts of the various figures and wherein:

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

As used herein, the terms "branch address prediction," "branch prediction," and "address prediction" are generally used interchangeably. The terms "assert" and "negate" are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

At least one embodiment of the present invention provides a data processing system having a first and a second mode of operation. The data processing system comprises a central processing unit having a first input to receive a first signal. A first state of the first signal enables the first mode of operation utilizing branch prediction, and a second state of the first signal enables the second mode of operation utilizing substantially no branch prediction. In another embodiment, a first mode of operation results in a first address setup timing, and the second mode of operation results in a second address setup timing. The second address setup timing allows for an earlier address valid time as compared to the first address setup timing. In at least one embodiment of the present invention, the data processing system comprises selecting circuitry for selecting between sequential addresses and target addresses, an instruction fetch unit, and associated control circuitry.

At least one embodiment of the present invention also provides a method for altering an address setup time. The method can be used in a data processing system having a first and a second mode of operation. The method comprises receiving a first input signal. If the first input signal has a first state, then the system operates in the first mode of operation, which results in a first address setup timing. If the first input signal has a second state, then the system operates in the second mode of operation, which results in a second address setup timing having an earlier address valid time as compared to the first address setup timing.

Figure 1:
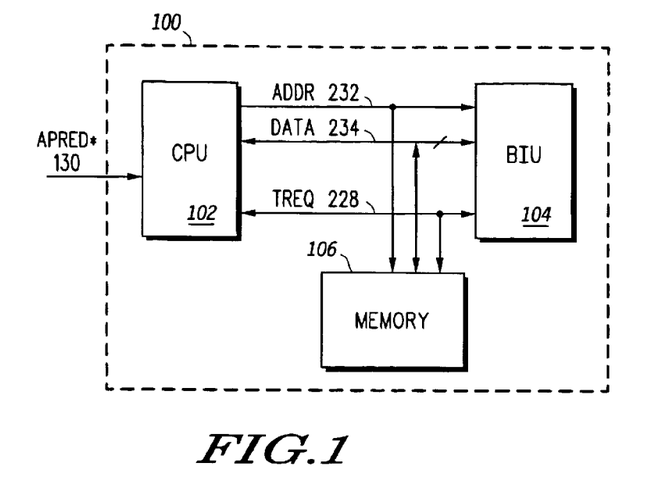
FIG. 1 is a block diagram of a data processing system according to one embodiment of the present invention.

Referring first to FIG. 1, a data processing system is illustrated and designated generally by reference numeral 100. Data processing system 100 comprises central processing unit CPU 102, Bus Interface Unit BIU 104, and Memory 106. CPU 102 is coupled to provide address requests to Memory 106 and BIU 104, and to receive data from Memory 106 and BIU 104. CPU 102 is also coupled to provide transaction request (TREQ) signals, such as fetch requests, to Memory 106 and BIU 104. Additionally CPU 102 is coupled to receive address prediction signal APRED* 130. CPU 102 is configured to be capable of operating in either a branch address prediction enabled mode or a branch address prediction disabled mode.

In one embodiment of the present invention, data processing system 100 is implemented as part of a system in which it is desirable to use branch address prediction in order to decrease the number of clock cycles used to fetch from branch target addresses. In such a system, it is desirable for CPU 102 to anticipate the outcome of conditional branch statements. If CPU 102 anticipates the outcome of a conditional branch statement correctly, the next desired instruction is already loaded into CPU 102 and processing may begin. If, however, CPU 102 incorrectly anticipates the results of a conditional branch statement, the anticipated data must be discarded and the correct information loaded into CPU 102, effectively resulting in a processing penalty for the incorrect branch prediction. In other instances, data processing system 100 may be implemented in a system in which it is undesirable to use branch prediction. Such a system may, for example, include memories with a minimal address set up time requirement. Since such memories do not require as much of the clock cycle to access information as slower memories, the time savings realized by using branch prediction techniques in such a system may not offset the penalties incurred due to wrong branch predictions. In effect, data processing system 100 implemented in such a system may operate faster without employing branch prediction.

In at least one embodiment of the present invention, address prediction signal APRED* 130 effectively toggles CPU 102 between two different modes of operation. In the first mode of operation branch address prediction is employed, while in the second mode of operation branch address prediction is inhibited. In this description of the present invention, the '*' in the signal name APRED* indicates that the asserted level of the signal is low. That is, active low indicates branch address prediction is enabled. However, alternate embodiments may utilize a signal of any active level to implement various aspects of the current invention. In one embodiment of the present invention, address prediction control signal APRED* 130 is tied to either a high or low voltage at the time data processing system 100 is integrated into a larger system. It can be appreciated, however, that although in one embodiment, the operating mode of CPU 102 is fixed to either utilize branch prediction or not utilize branch prediction, in alternate embodiments, address prediction control signal APRED* 130 may be supplied by a control register or other control circuitry such that the mode of CPU 102 can be altered as desired.

Figure 2:
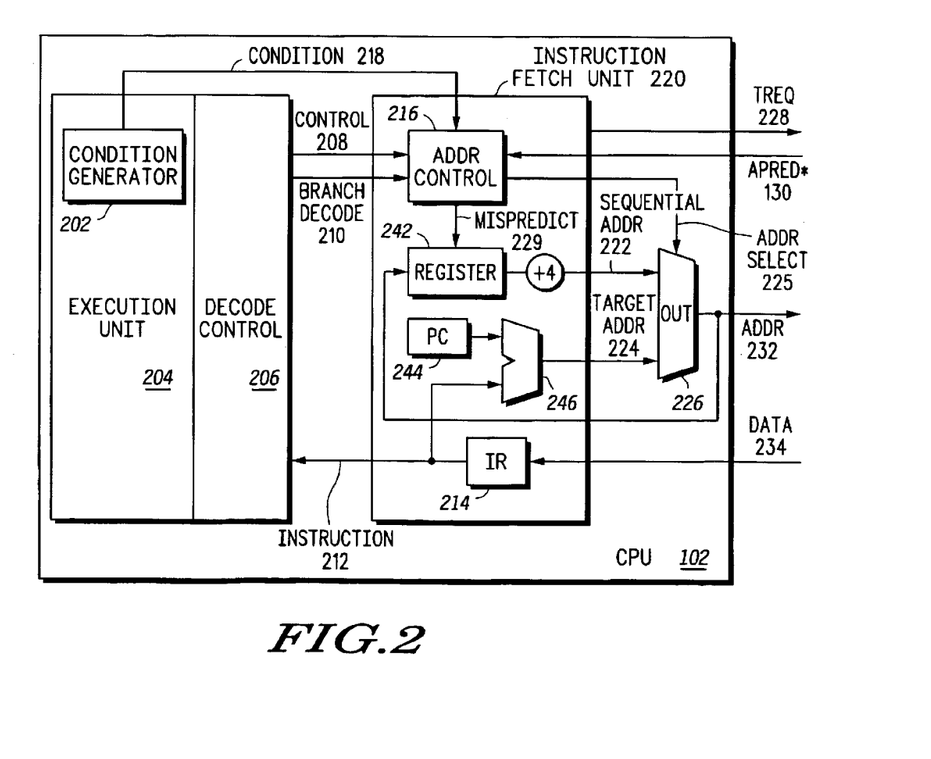
FIG. 2 is a block diagram of the central processing unit shown in FIG. 1, according to at least one embodiment of the present invention.

Referring next to FIG. 2, the operation of CPU 102 will be discussed in greater detail. Reference numerals in FIG. 2 which are like, similar or identical to reference numerals in FIG. 1 indicate like, similar or identical features or elements. In one embodiment, CPU 102 includes execution unit 204, decode control 206, instruction fetch unit 220, and address multiplexer 226. Execution unit 204 is the portion of CPU 102 in which program instructions are carried out, and in which conditional branching instruction conditions are evaluated. Execution unit 204 includes condition generator 202, which is used to generate a true or false signal based upon the results of a condition evaluation instruction. For example, in at least one embodiment of the present invention, if the results of a condition evaluation instruction indicate that the specified condition has been met, then condition generator 202 generates a true signal. Other embodiments can employ different logic, and so may generate a false signal to indicate that a specified condition has not been met, as appropriate for the logic scheme being used. One example of a condition evaluating instruction is an instruction which compares the values of two data items to determine whether they are equal and then generates a resulting condition (or condition code). Numerous other comparison types and other condition generating instructions are well known in the art. Conditional branch instructions may test for a specific value or result of the condition evaluating instruction, or in some cases may contain the condition to be tested as part of the conditional branch instruction itself. Based on the result of the test, the normal sequential instruction execution sequence may be redirected to the target location of the branch instruction if the condition for branching is met.

Decode control 206 decodes instruction 212 in preparation for execution by execution unit 204, and provides BRANCH DECODE 210 and CONTROL 208 to instruction fetch unit 220. Instruction fetch unit 220 includes address control 216, holding register 242, program counter 244, instruction register 214, and adder 246.

Address control 216 receives as inputs CONDITION 218, CONTROL 208, BRANCH DECODE 210 and APRED* 130. Based upon the state of each of these inputs, ADDRESS SELECT 225 is set to a true or false state. In one embodiment, a true state indicates that multiplexer 226 will output SEQUENTIAL ADDR 222 as ADDR 232, while a false state indicates that TARGET ADDR 224 should be output as ADDR 232. The output of address multiplexer 226 is fed back to holding register 242. In one embodiment, the value stored in holding register 242 is then incremented by four to generate SEQUENTIAL ADDR 222. Adder 246 determines TARGET ADDR 224 by adding the value stored in program counter 244 to an address offset provided by instruction register 214 obtained from a portion of the branch instruction opcode. Multiplexer 226 then selects between SEQUENTIAL ADDR 222 and TARGET ADDR 224 based on ADDR SELECT 225. The selected address is then output as ADDR 232.

DATA 234 is received by CPU 102 in response to transaction request (TREQ) 228 and ADDR 232 generated by CPU 102. TREQ 228 and ADDR 232 are provided to BIU 104 and MEMORY 106 (see FIG. 1). BIU 104 or MEMORY 106 retrieves information from the requested memory address indicated by ADDR 232, and then delivers this information to CPU 102 as DATA 234. DATA 234 may include both instructions to be carried out by CPU 102 and the data to be used in carrying out any required operations dictated by the instructions.

Any instruction, such as INSTRUCTION 212 included in DATA 234, is passed to instruction register 214, which in turn passes INSTRUCTION 212 to decode control 206, where it is prepared for use by execution unit 204. Decode control 206 then passes INSTRUCTION 212 to execution unit 204 where the operations specified by INSTRUCTION 212 are carried out. In the event that INSTRUCTION 212 includes a branch instruction, decode control 206 begins decoding the branch instruction and preferably sets BRANCH DECODE 210 to true. Branch decode 210 is one of the inputs used to enable address multiplexer 226 to select between sequential address 222 and target address 224. DECODE CONTROL 206 also provides other control signals, such as CONTROL 208 to address control 216.

As mentioned earlier, condition generator 202 generates signal CONDITION 218, which is one of the inputs to address control 216 used to control the selection of SEQUENTIAL ADDR 222 or TARGET ADDR 224 by address multiplexer 226. CONDITION 218 is generated in response to the result of a condition generating instruction executed by execution unit 204. When a branch instruction is being executed, CONDITION 218 is used in determining the results of the branch condition evaluation, and thus whether a branch is taken or falls through to the next sequential instruction. Address control 216 is capable of controlling address multiplexer 226 to output TARGET ADDR 224 as ADDR 232 based on a prediction of the outcome (condition) of branch instructions. However, address control 216 may be inhibited from directing address multiplexer 226 from outputting target address TARGET ADDR 224 as ADDR 232, in the event that address prediction control signal APRED* 130 is configured to inhibit CPU 102 from operating in a branch prediction operation mode. In such a case, the output of address control 216 will be held until the condition of a branch instruction has been evaluated, and the determination of the correct next instruction to fetch has been made. The correct instruction may be either the target instruction at the branch destination if the branch condition is met, or an instruction following (in sequence from) the branch instruction if the branch condition is not met.

When branch address prediction mode is enabled, if the prediction is determined to be incorrect, MISPREDICT 229 is asserted to holding REGISTER 242 preventing holding REGISTER 242 from capturing the predicted address. This allows the processor to recover from a misprediction because the last sequential address is preserved in holding REGISTER 242 and is not over-written by the predicted address. Once misprediction is determined to have occurred, the processor must begin refilling the instruction pipeline with the sequential instruction stream by asserting ADDR SELECT 225 to select SEQUENTIAL ADDR 222 to be driven as ADDR 232.

Figure 3:
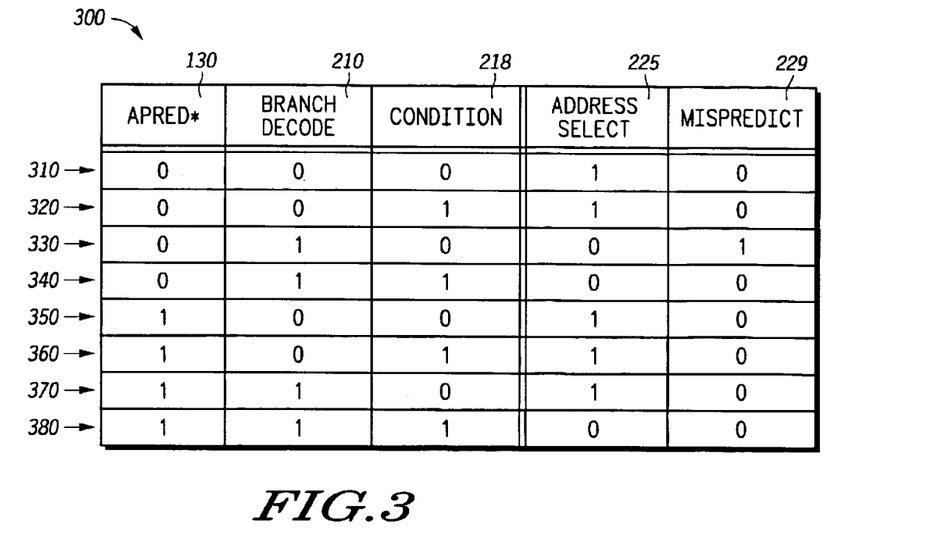
FIG. 3 is a truth table for the address selection control in FIG. 2, according to one embodiment of the present invention.

Referring next to FIG. 3, a truth table for address control 216 is illustrated and designated generally by reference numeral 300. Note that address control 216 is capable of operating in either an address prediction enabled mode, or in an address prediction disabled mode. Rows 310-340 illustrate the functioning of address control 216 when address prediction is enabled, while rows 350-380 illustrate the functioning of address control 216 when address prediction is disabled. Rows 350 and 360 illustrate address control 216 when APRED* 130 is negated (indicating an address prediction disabled mode) and BRANCH DECODE is false (indicating no branch instruction has been received). In both of these cases, ADDR SELECT 225 is true, indicating the next sequential address is to be selected regardless of the state of CONDITION 218. Rows 370 and 380 illustrate address control 216 when APRED* 130 is negated and BRANCH DECODE is true (indicating that a branch instruction has been received). In both of these cases, the state of ADDR SELECT 225 is dependent upon CONDITION 218, and will be false when a branch is to be taken as illustrated in row 380, and true when a branch is not to be taken as illustrated in row 370. MISPREDICT 229 should remain false when APRED* 130 is negated, since no address prediction is being used. However, MISPREDICT 229 may simply be ignored or treated as a don't care, when APRED* 130 is negated.

Rows 310 and 320 illustrate address control 216 when APRED* 130 is asserted (indicating an address prediction enabled mode) and BRANCH DECODE is false (indicating no branch instruction has been received). In both of these cases, ADDR SELECT 225 is true (indicating the next sequential address is to be selected) regardless of the state of CONDITION 218. Additionally, MISPREDICT 229 is false in both rows 310 and 320 because no branch instruction has been received. Rows 330 and 340 illustrate address control 216 when APRED* 130 is asserted and BRANCH DECODE is true (indicating that a branch instruction has been received). In both of these cases, the state of ADDR SELECT 225 is false, because the state of CONDITION 218 is not yet known, and a prediction must be made. Row 330 illustrates that when an incorrect prediction is made, MISPREDICT 229 is true.

Figure 4:
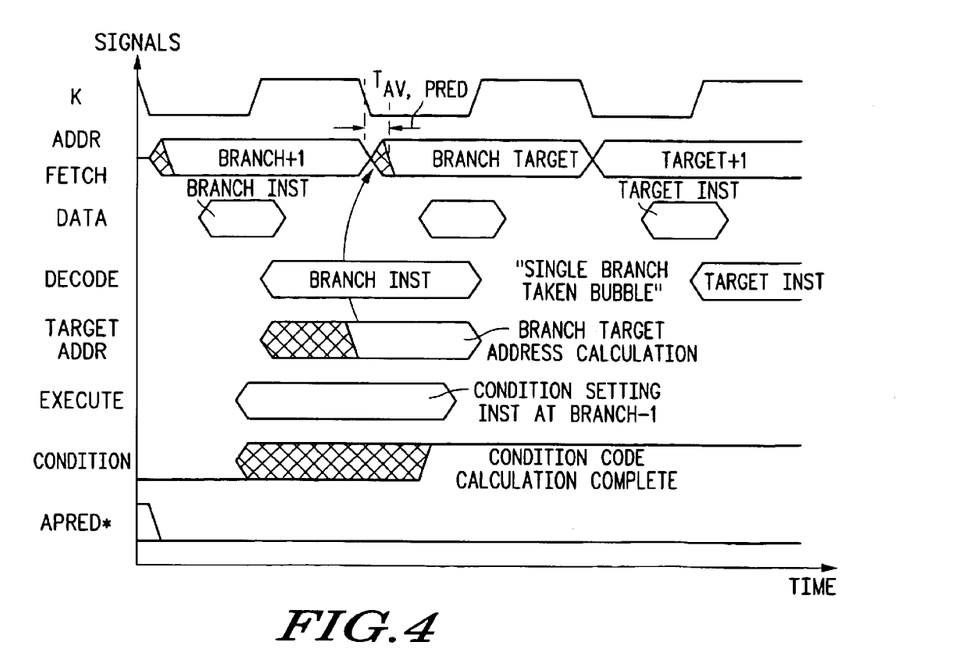
FIG. 4 is a timing diagram illustrating processor timing for the case in which address prediction is enabled and a correct prediction has been made, according to at least one embodiment of the present invention.

Referring next to FIG. 4, a timing diagram according to one embodiment of the present invention is illustrated. FIG. 4. illustrates activity in three stages of the processor pipeline (the FETCH, DECODE, and EXECUTE stages) while executing a sequence of instructions including a condition setting instruction and a conditional branch instruction. The processor pipeline operates such that each instruction flows through these three stages in sequence. FIG. 4 shows that while a condition setting instruction is in the execute stage of the pipeline (BRANCH−1), the next sequential instruction, a conditional branch instruction (BRANCH) is in the decode stage of the pipeline, and a fetch is occurring for the instruction following the branch instruction in sequence (BRANCH+1). In FIG. 4 and subsequent figures, a cross-hatched legend is used on signals and activity to indicate that they are not currently valid (or completed).

The timing diagram in FIG. 4 illustrates processor timing for the case in which address prediction is enabled, a correct prediction has been made, and a single branch taken bubble is introduced into the pipeline. During the fetch phase of the processor pipeline, the instruction address (illustrated as ADDR) is driven out for the next access, and the instruction data (illustrated as DATA) for the current access is loaded into the CPU. In this and subsequent examples, the instruction data indicated with "BRANCH INST" is assumed to include a conditional branch instruction. Once loaded, the branch instruction is decoded and a calculation is performed to obtain the branch target address that will be used.

After the branch target address calculation is completed, the processor sends a fetch request for information from the memory location indicated by the branch target address calculation (this is the predicted address). This fetch request occurs at about the same time that the branch instruction decoding is being completed, and the branch condition code is being resolved. Therefore, sometime after the branch target address calculation is completed and the branch target address is being fetched, the condition code will indicate whether the prediction made to fetch from the branch target address is correct. Note that the time that the address becomes valid ($T_{av,\,pred}$) occurs a short time after the fall of the clock K. In the case illustrated in FIG. 4 the condition code is resolved, and indicates that a correct prediction has been performed (i.e. branch target address fetch is the correct action). The only delay to processing that has been introduced in this example is the single branch taken bubble, which results any time a target address calculated from a branch instruction is used to redirect the instruction execution stream. In one embodiment of the current invention, since the predicted target address is not dependent on condition evaluation, but is valid as soon as the target address calculation (by adder 246) completes and is driven by address multiplexer 226, the delay from the falling edge of the clock K to a valid address output ADDR, $T_{av,pred}$, is minimized relative to waiting on the completion of condition evaluation, which typically occurs later than the result of the target address calculation.

Figure 5:
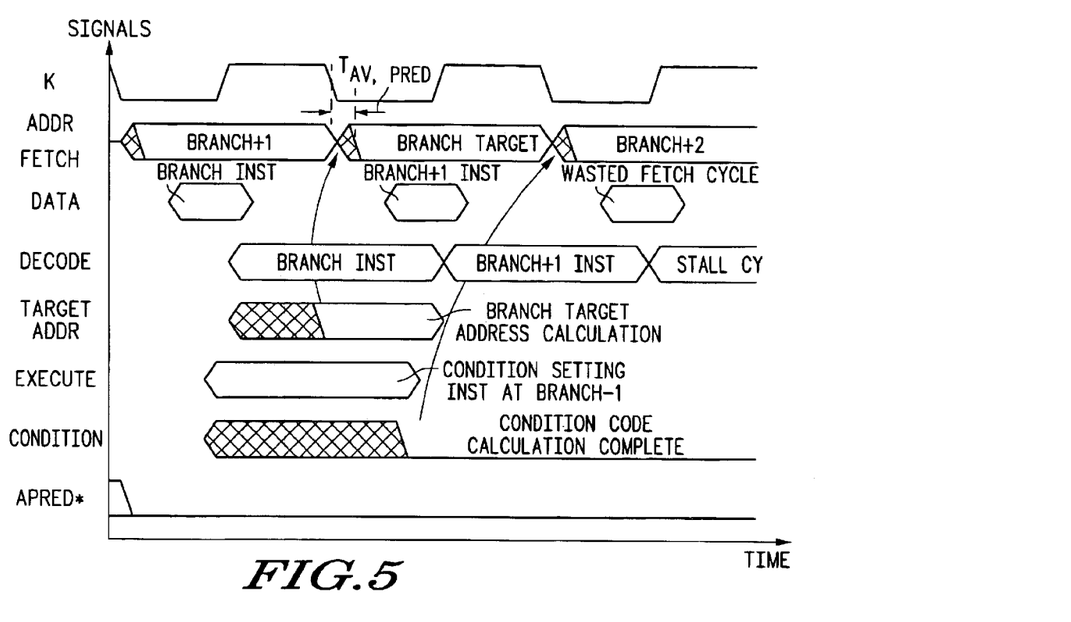
FIG. 5 is a timing diagram illustrating processor timing for the case in which address prediction is enabled and an incorrect prediction has been made, according to at least one embodiment of the present invention.

Referring next to FIG. 5, another timing diagram according to an embodiment of the present invention is illustrated. Reference designations in FIG. 5 which are like, similar or identical to reference designations in FIG. 4 indicate like, similar or identical features or elements. The timing diagram illustrated in FIG. 5 is for the case in which address prediction is enabled, and an incorrect prediction has been made resulting in a stall cycle. Note that the address valid timing is the same in FIG. 5 as it is in FIG. 4. That is, it is not dependent on condition evaluation, but is valid as soon as the target address calculation (by adder 246) completes and is driven by address multiplexer 226. During the fetch phase of the processor pipeline, the instruction address and instruction data are loaded. In the decode phase, the branch instruction is decoded and a prediction is made to use the results of the branch target address calculation. The address returned by the branch target address calculation is used for the fetch during the next clock cycle (at close to the same time the condition setting instruction is being executed). Upon completion of the condition code calculation, the condition code upon which the branch depends has been resolved, and thus it is known whether the branch prediction was correct or not. FIG. 5 illustrates timing when an incorrect prediction has been made in fetching an instruction from the branch target address. Upon completion of the condition code evaluation, the branch is determined to have been mispredicted, and so the address of the next (correct) sequential instruction must be fetched. This instruction is designated in FIG. 5 as "BRANCH+2". Due to the processor pipeline, the instruction immediately in sequence from the branch instruction ("BRANCH+1") was previously fetched while the branch instruction itself entered the decode stage of the pipeline. This misprediction in fetching from the branch target address effectively wastes any clock cycles that were used in fetching the predicted (wrong) address.

It can be seen from FIGS. 4 and 5 that an early address valid timing is obtained when operating in a branch address prediction mode, since the result of the branch target address calculation is generally available prior to the condition generation and thus the resolution of the branch instruction. In addition, if the branch prediction is incorrect, the penalty for this early address valid timing is a wasted fetch from the branch target address which is later discarded.

Figure 6:
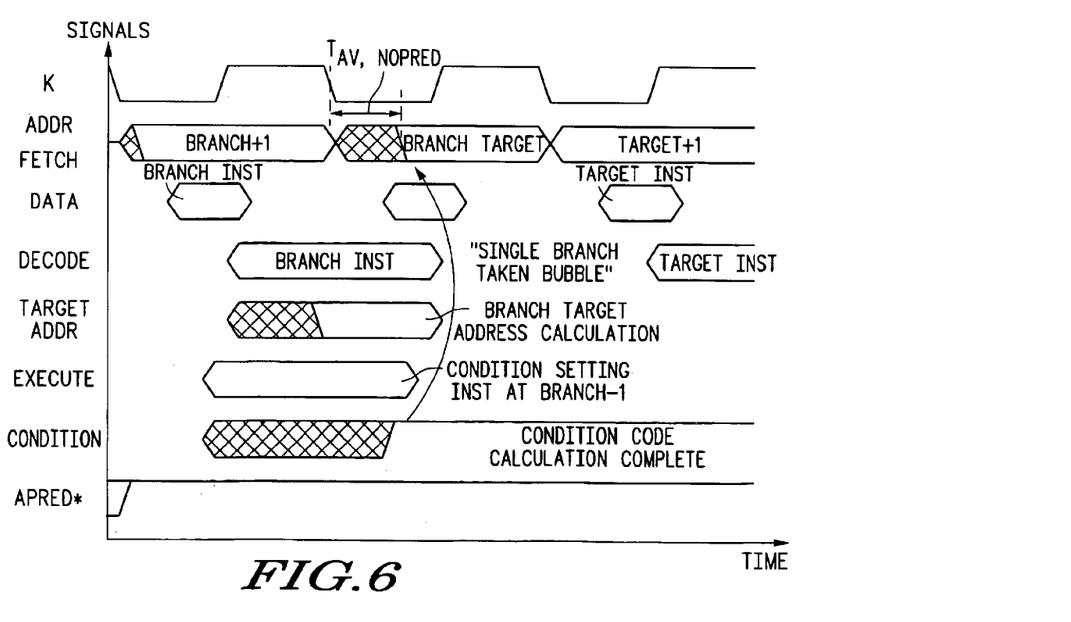
FIG. 6 is a timing diagram according to an embodiment of the present invention, and illustrates processor timing for the case in which address prediction is disabled, and a target address indicated by a branch instruction is fetched.

Referring next to FIG. 6, a timing diagram according to one embodiment of the present invention will be discussed. Reference designations in FIG. 6 which are like, similar or identical to reference designations in FIGS. 4 and 5 indicate like, similar or identical elements. The timing diagram illustrated in FIG. 6 deals with the case where address prediction is disabled (APRED* 130 signal negated) and a branch instruction has been received. As in FIGS. 4 and 5, during the fetch phase instruction address and instruction data are fetched. The branch instruction is then decoded and a branch target address is calculated. Unlike the timing illustrated in FIGS. 4 and 5, however, the branch target address is not immediately fetched. Instead, the processor waits to select the next address to be fetched until after the condition code calculation is complete, the branch instruction is resolved to be either taken or not taken, and the correct next fetch address is known. Also note that unlike FIGS. 4 and 5, in which address prediction is enabled, the time after which a valid address is available ($T_{av,\ nopred}$) is farther from the clock fall time (as compared to $T_{av,\ pred}$). The selection of the proper next address does not occur until after the completion of the condition code calculation, which typically is slower than the branch target address calculation. By waiting until the condition code calculation is complete, there is no chance of fetching a wrong address due to an incorrect address prediction.

Figure 7:
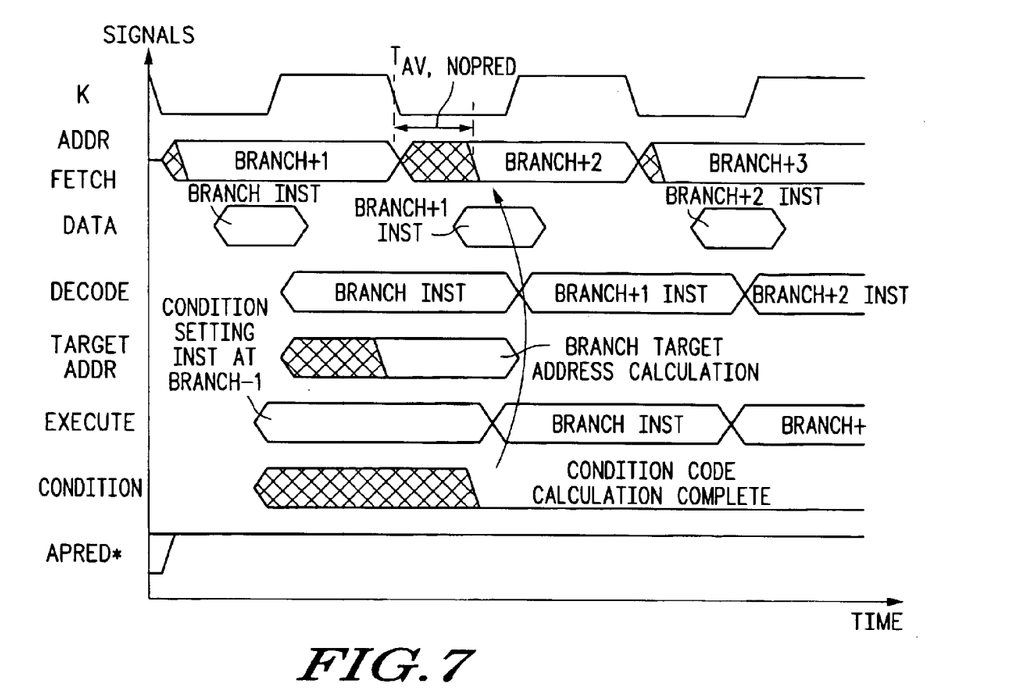
FIG. 7 is a timing diagram according to an embodiment of the present invention, and illustrates the case in which address prediction is disabled and a branch instruction "falls through" and the next sequential instruction is fetched.

Referring next to FIG. 7, a timing diagram according to at least one embodiment of the present invention is illustrated. Reference numerals in FIG. 7 which are like, similar, or identical to reference designations in FIGS. 4-6 indicate like, similar, or identical elements or features. Again, instruction data and instruction address are received during the fetch cycle, the branch instruction is decoded, and a branch target calculation is performed. Again the branch target address calculation is not used to immediately fetch the next memory address. Instead, after the condition code calculation is complete, the proper memory address to be fetched (either the next sequential memory location or the calculated target address) is selected. In this way no erroneous predictions are made. In FIG. 7, the branch condition is not met, thus the branch resolves to not taken, and the correct next fetch address is to the instruction "BRANCH+2". This sequential address is driven out following the completion of the condition code calculation.

The difference in address setup timing between the mode of operation with address prediction enabled and the mode of operation with address prediction disabled is therefore apparent. With address prediction enabled, an earlier address valid time is provided as compared to when address prediction is disabled. That is, $T_{av,\ pred}$ is generally less than $T_{av,\ nopred}$. Note that the memory access timing (the amount of time needed for a memory address to return valid data) requirements are more stringent in non-address prediction mode than they are in address prediction enabled mode. That is, memories used in conjunction with address prediction inhibited mode should be able to return valid data faster than memories used in branch address prediction mode, since the address inputs to the memory device are valid later in the clock cycle. Alternative embodiments may perform a more aggressive form of address prediction in the address prediction enabled mode, and perform a less aggressive form of address prediction in the mode where address prediction is disabled. In this embodiment, the more aggressive form of address prediction would generally result in an earlier address valid time as compared to the less aggressive form. The less aggressive form may perform less branch prediction or substantially no branch prediction and thus result in a later address valid time Therefore, the advantages described in reference to FIGS. 4–7 may be obtained by allowing for different levels of branch prediction rather than by simply enabling or disabling branch prediction all together.

Note that when address prediction is not used, the number of clock cycles used to fetch the correct next address while a conditional branch instruction is being executed is the same whether the branch is taken or not, while in the address prediction enabled mode, the number of clock cycles used varies depending upon whether a correct prediction is made or not.

By providing the flexibility to operate in either a branch address prediction mode in which memory addresses are generated earlier with a corresponding penalty for an incorrect prediction, or in a non-prediction mode in which address generation is delayed but wherein no additional instruction fetches are performed, embodiments of the present invention allow the advantage of being suited to a broader scope of applications than prior art data processing systems. Prediction accuracy and memory access time tradeoffs are available which allow optimization of the operation of the described data processing system.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A data processing system having a first and a second mode of operation, comprising:
    a central processing unit having a first input to receive a first signal wherein a first state of the first signal enables the first mode of operation and a second state of the first signal enables the second mode of operation, wherein:
    the first mode of operation utilizes branch prediction;
    the second mode or operation utilizes substantially no branch prediction; and
    the central processing until comprise:.
        selecting circuitry having a first input for receiving a sequential address, a second input for receiving a target address, and a third input for receiving a control signal to select between the first input and the second input, and an output for providing one of the first input and the second input;
        an instruction fetch unit, coupled to the selecting circuitry, having a first output to provide the sequential address and a second output for providing the target address; and
        control circuitry coupled to the selecting circuitry having a first input to receive the first signal, having a first output to provide the control signal based on the first signal, having a second input to receive a condition signal, and having a third input to receive a branch decode signal, wherein the control signal is based further in part on the condition signal and the branch decode signal.

2. The data processing system of claim 1, wherein the condition signal indicates a condition code calculation and the branch decode signal indicates that a branch instruction is being decoded.

3. The data processing system of claim 2, wherein the central processing unit further comprises:
    a decode control unit, coupled to the control circuitry, having an output to provide the branch decode signal; and
    an execution unit, coupled to the decode control unit, having an output to provide the condition signal.

4. The data processing system of claim 1, wherein the first signal is hardwired to a predetermined slate.

5. The data processing system of claim 1, further comprising a control register having a field corresponding to the first signal, wherein the field is capable of being dynamically programmed.

6. The data processing system of claim 1, wherein the data processing system comprises only the central processing unit.

7. The data processing system of claim 1, wherein:
    the first mode of operation results in a first address setup timing; and
    the second mode of operon results in a second address setup timing, wherein the first address setup timing allows for an earlier address valid time as compared to the second address setup timing.

8. A data processing system having a first and a second mode of operation, comprising:
    a first input to receive a first signal wherein a first state of the first signal enables the first mode of operation and a second state of the first signal enables the second mode of operation, wherein:
    the first mode of operation allows for a first address valid time corresponding to a first driven address, the first address valid time providing a first memory access time within a clock cycle in which the first address is driven; and
    the second mode or operation allows for a second address valid time corresponding to a second driven address, wherein the second address valid time provides additional memory access time, as compared with the first memory access time, within a clock cycle in which the second address is driven.

9. The data processing system of claim 8, wherein the first address setup tinting is realized utilizing a first level of branch prediction, and the second address setup timing is realized utilizing a second level of branch prediction that is mote aggressive than the first level of branch prediction.

10. The data processing system of claim 9, wherein the first mode of operation performs substantially no branch predictions.

11. The data processing system of claim 8, wherein the central processing unit comprises:
    selecting circuitry having a first input for receiving a sequential address, a second input for receiving a target address, and a third input for receiving a control signal to select between the first input and the second input, and an output for providing ones of the first input and the second input;
    an instruction fetch unit, coupled to the selecting circuitry, having a first output to provide the sequential address and a second output for providing the target address; and
    control circuitry, coupled to the selecting circuitry, having a first input to receive the first signal and having a first output to provide the control signal based on the first signal.

12. The data processing system of claim 8, wherein the first signal is hardwired to a predetermined state.

13. The data processing system of claim 8, further comprising a control register having a field corresponding to the first signal, wherein the field is software programmable.

14. In a data processing system having a first and a second node of operation, a method for altering an address setup time comprising:

receiving a first input signal;

if the first input signal has a first state, operating in the first mode of operation, wherein the first mode of operation allows for a first address valid time corresponding to a first driven address, the first address valid time providing a first memory access time within a clock cycle in which the first address is driven;

if the first input signal has a second state, operating in the second mode of operation, wherein the second mode of operation allows for a second address valid time corresponding to a second driven address, wherein the second address valid time provides additional memory access time, as compared with the first memory access time, within a clock cycle in which the second address is driven.

15. The method of claim 14, wherein the first mode of operation utilizes a first level of branch prediction and the second mode of operation utilizes a second level of branch prediction.

16. The method of claim 15, wherein the first level is less aggressive than the second level.

17. The method of claim 16, wherein the first level performs substantially no branch predictions.

18. The method of claim 14, wherein operating in the first mode of operation comprises resolving a condition of a branch instruction prior to accessing a target instruction of the branch instruction.

* * * * *

UNITED STATES PATENT AND TRADEMARK OFFICE
CERTIFICATE OF CORRECTION

PATENT NO. : 6,859,875 B1
APPLICATION NO. : 09/592449
DATED : February 22, 2005
INVENTOR(S) : William C. Moyer Page 1 of 1

It is certified that error appears in the above-identified patent and that said Letters Patent is hereby corrected as shown below:

In Column 9, Line 42, Claim No. 1:
    Change "the central processing until comprise:." to --the central processing unit comprise:--

In Column 10, Line 33, Claim No. 8:
    Change "the second mode or operation allows for a second address" to --the second mode of operation allows for a second address--

In Column 10, Line 40, Claim No. 9:
    Change "address setup tinting is realized utilizing a first level" to --address setup timing is realized utilizing a first level--

In Column 10, Line 43, Claim No. 9:
    Change "mote aggressive than the first level" to --more aggressive than the first level--

In Column 11, Line 2, Claim No. 14:
    Change "node of operation," to --mode of operation,--

Signed and Sealed this

Seventeenth Day of June, 2008

JON W. DUDAS
*Director of the United States Patent and Trademark Office*